(12) United States Patent
Koukal et al.

(10) Patent No.: US 9,421,573 B2
(45) Date of Patent: Aug. 23, 2016

(54) BELLOWS FOR A PASSAGE BETWEEN TWO PIVOTALLY CONNECTED VEHICLES OR OF AN AIRCRAFT PASSENGER BRIDGE OR STAIRWAY

(71) Applicant: Hübner GmbH & Co. KG, Kassel (DE)

(72) Inventors: Claus-Ekkehard Koukal, Kassel (DE); Roswitha Coosmann, Lohfelden (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 14/312,067

(22) Filed: Jun. 23, 2014

(65) Prior Publication Data

US 2014/0302243 A1    Oct. 9, 2014

Related U.S. Application Data

(63) Continuation of application No. 14/062,324, filed on Oct. 24, 2013, now abandoned.

(30) Foreign Application Priority Data

Oct. 24, 2012 (DE) .................. 20 2012 010 19 U

(51) Int. Cl.
*B05D 5/08* (2006.01)
*F16J 15/04* (2006.01)
*F16J 3/04* (2006.01)
*B05D 1/02* (2006.01)

(52) U.S. Cl.
CPC .. *B05D 5/08* (2013.01); *B05D 1/02* (2013.01); *F16J 3/041* (2013.01); *F16J 15/04* (2013.01)

(58) Field of Classification Search
CPC ................ F16J 3/00; F16J 3/04; F16J 3/041; F16J 3/043
USPC ............................ 277/634, 635, 636; 118/300
See application file for complete search history.

(56) References Cited

U.S. PATENT DOCUMENTS

| | | | | | |
|---|---|---|---|---|---|
| 4,558,869 | A | * | 12/1985 | Grove | F16J 3/046 156/308.6 |
| 5,021,271 | A | * | 6/1991 | Hennig | 428/36.2 |
| 8,318,868 | B2 | * | 11/2012 | Henze et al. | 525/457 |
| 2008/0207846 | A1 | * | 8/2008 | Henze et al. | 525/452 |
| 2011/0193256 | A1 | * | 8/2011 | Henze et al. | 264/148 |
| 2012/0291701 | A1 | | 11/2012 | Grasegger et al. | |
| 2014/0291938 | A1 | * | 10/2014 | Koukal et al. | 277/345 |

FOREIGN PATENT DOCUMENTS

| | | |
|---|---|---|
| CN | 102145641 A | 8/2011 |
| CN | 102328669 A | 1/2012 |
| CN | 102463862 A | 5/2012 |
| DE | 10246236 B3 | 4/2004 |
| DE | 102009023823 A1 | 12/2010 |
| DE | 102010006909 A1 * | 8/2011 |
| EP | 2404748 A1 | 1/2012 |
| WO | WO 2011095157 A1 * | 8/2011 |

OTHER PUBLICATIONS

Chinese Office Action issued in co-pending application Serial No. 2013105055326, issued Jun. 1, 2015.

* cited by examiner

*Primary Examiner* — Gilbert Lee

(74) *Attorney, Agent, or Firm* — Dinsmore & Shohl LLP; Douglas L. Wathen

(57) ABSTRACT

A bellows for a passage between two pivotally connected vehicles or an aircraft passenger bridge or stairway has bellows material with a coating. The material of the bellows has a protective layer printed on at least partially as a coating.

11 Claims, 1 Drawing Sheet

BELLOWS FOR A PASSAGE BETWEEN TWO PIVOTALLY CONNECTED VEHICLES OR OF AN AIRCRAFT PASSENGER BRIDGE OR STAIRWAY

REFERENCE TO RELATED APPLICATION

This application is a continuation of U.S. patent application Ser. No. 14/062,324, filed Oct. 24, 2013, which claims priority to German patent application No. DE 20 2012 010 192.7, filed Oct. 24, 2012, the contents of which are incorporated herein in their entirety.

FIELD OF THE INVENTION

The invention relates both to a bellows for a passage between two pivotally connected vehicles and to a bellows of an aircraft passenger bridge or aircraft passenger stairway, wherein the bellows material has a coating.

BACKGROUND OF THE INVENTION

Bellows as a part of a passage are sufficiently known from the prior art; the bellows are configured, for example, as folding bellows or also as corrugated bellows. Folding bellows are configured in the manner of a concertina and typically have an aluminum frame, which is U-shaped in cross-section, on their outside in the region of the gusset. These aluminum frames serve to increase the stiffness of the bellows.

Such frames, which likewise serve to increase the stiffness of the bellows, are also provided in a corrugated bellows in the region of the transition from one corrugation to the next corrugation.

The material for manufacturing the bellows comprises in detail at least one coat, but preferably a plurality of coats, of a reinforcement material, with a respective layer of an elastomer being provided on both sides of the reinforcement material. The coating of an elastomer can, for example, be a TPU, an EPDM or also a silicone. In particular the use of silicone has the great advantage of higher fire-resistance and UV-resistance.

It is now known that the thicker the coating is, the heavier the bellows become. This means that a bellows provided with a thick coating is very prone to sagging, which requires special measures to avoid the sagging. It is already known in this connection to provide a suspension device on the top side of the bellows from which the bellows is suspended. However, a certain thickness of the elastomer coating is necessary to ensure the leaktightness of the bellows material. The coating process itself also causes a certain thickness of the coating to be necessary.

It is furthermore known that bellows become dirty over time. Buses and rail vehicles are admittedly driven through washing systems, but it is in particular the case with folding bellows that the washing brushes do not extend in parallel with the folds, but rather transversely thereto. In this respect, the bellows is essentially not cleansed by a washing system of a conventional kind. Cleaning must rather be carried out by hand with the aid of a high-pressure cleaner as a rule. The use of high-pressure cleaners for cleaning bellows is in another respect also known in the aircraft passenger bellows of aircraft passenger bridges or aircraft passenger stairways. The use of high-pressure cleaners, however, has the disadvantage that the bellows wear faster from the use of high-pressure cleaners.

It has, however, been shown that surfaces having a lotus effect offer the dirt fewer weak points for adhesion, or dirt which collects detaches substantially more easily from the surface.

The surfaces of conventionally manufactured bellows materials are such that they are contaminated more or less strongly in dependence on the area of use and such that the dirt adheres strongly to the surface. This is due to the surface of the coating material or also to the reinforcement material if the latter presses through the coating.

In this connection, a bellows is known from DE 10 2009 023 823 B4, wherein the bellows material between the frame is laminated by a film. Such a film is easy to clean. It has, however, been found that the film does not remain permanently connected to the folding bellows material due to the movement of the bellows.

A so-called lacquer-coated bellows is known from DE 10 2010 006 939 A1, wherein a lacquer film is applied to the bellows material. The lacquer film is also easy to clean. This lacquer film also does not form any permanent connection to the coating material of the bellows.

SUMMARY OF THE INVENTION

The underlying object of the invention consequently comprises providing a bellows of a passage between two pivotally connected vehicles, for example in a bus or in a rail transport vehicle, wherein the surface of the bellows material is insensitive to dirt, but nevertheless permanently adheres to the bellows material.

To achieve the object, it is proposed in accordance with the invention that the material of the bellows at least partially has an imprinted protective layer. The layer applied to a support in a printing process is characterized by an extremely small thickness, on the one hand, and by a surface similar to the lotus flower effect, on the other hand. This means that a relatively thin protective layer can be applied to the bellows material which provides the bellows with a dirt-repellent surface. It is conceivable in this respect to apply the protective layer directly onto the completely manufactured bellows material, that is onto the outer elastomer layer, or there is even the possibility of applying one or more such protective layers to the reinforcement material of the bellows material itself in order in this manner to configure the reinforcement material as impervious in the sense of liquid-tight, that is wind-repelling and rain-repelling. This means that the term of bellows material comprises both the coated fabric and the uncoated fabric. It has been found that it can be sufficient, in particular with a fabric that is tightly woven, if the coating material for forming the protective layer is applied to the reinforcement material by way of printing, for example by way of digital printing, e.g. by way of an inkjet process. The material applied by way of printing can be a dye or also any other material which admittedly remains elastic after application, but nevertheless dries out. Materials on a polymer base can be used as coating materials which can e.g. be applied by way of the inkjet process; such materials on a polymer base can in particular be admixed with nanoparticles to configure the surface as impervious and dirt-repellent. Bellows materials which e.g. have a fabric as a base, which are impervious toward environmental influences and which are moreover very light due to the small thickness of the printed layer can already be manufactured at resolutions of 700 to 5700 dpi and the bellows are therefore only prone to sagging to a small degree.

As already stated in another connection, the bellows material has at least one reinforcement material which can, for example, be a fabric, a crocheted fabric or a knitted fabric.

BRIEF DECRIPTION OF THE FIGURES

The invention will be described in more detail in the following by way of example with reference to the drawings.

DETAILED DESCRIPTION OF THE INVENTION

Figure 1:
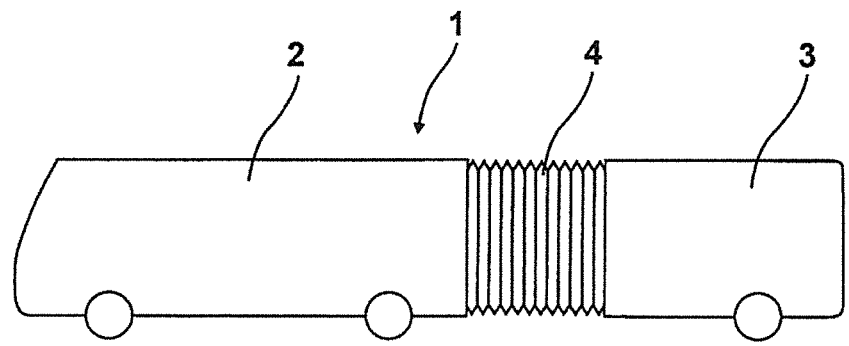
FIG. 1 is a side view of an exemplary articulated vehicle, e.g. a bus.
Figure 2:
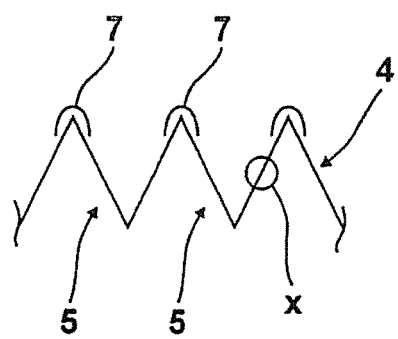
FIG. 2 is a cross-sectional schematic of a section of a folding bellows.

The articulated vehicle has the reference numeral 1, with a bellows, in particular a folding bellows 4, being provided between the two vehicle parts 2 and 3 of the articulated vehicle. FIG. 2 shows a section of the folding bellows 4, with the individual folds 5 being held in the region of the outer gusset by bellows frames 7, which are U-shaped in cross-section. The bellows frame, which is U-shaped in cross-section, is preferably manufactured from aluminum.

Figure 3:
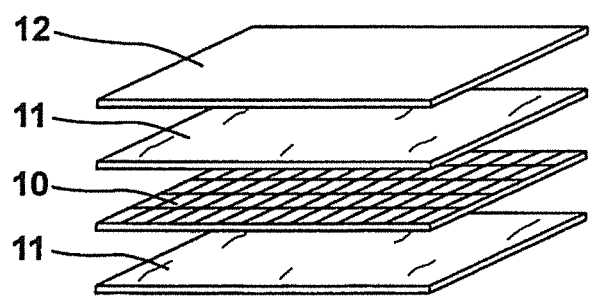
FIG. 3 is a view of the detail X of FIG. 2 showing a piece of the bellows material in an exploded view.

A section of a fabric in accordance with the detail X of is shown in a perspective view in FIG. 3. In this respect, a fabric layer is shown as a reinforcement material having the reference numeral 10. The reinforcement material 10 can in this respect be covered on both sides with e.g. an elastomer layer 11 as a coating which is in particular applied to the reinforcement material by way of calendering. A protective layer 12 is subsequently applied to this elastomer layer; for example, a dye layer which has a surface structured in accordance with the lotus effect in order thus to ensure that dirt particles only have small adhesive forces toward the coating material of the bellows. It can be sufficient in this respect if the protective layer is only applied to the outside of the bellows. It is, however, also conceivable to apply the protective layer directly onto a tightly woven fabric by the printing process. Such a procedure has been found to be particularly space-saving. If necessary, the application of the protective layer has to take place in a plurality of passes to ensure that the bellows material is impervious.

REFERENCE NUMERAL LIST 1 articulated vehicle
2 vehicle part
3 vehicle part
4 folding bellows
5 folds
7 bellows frame
10 reinforcement material
11 coating of an elastomer layer
12 protective layer

The invention claimed is:

1. A method of manufacturing a bellows for a passage between two pivotally connected vehicles or an aircraft passenger bridge or stairway, the method comprising:
   providing a flexible bellows material comprising at least one reinforcement material having an outer surface with at least one elastomer coating covering the outer surface; and
   printing a flexible coating onto the at least one elastomer coating of the bellows material so as to form a protective layer, the protective layer remaining flexible after printing;
   whereby a bellows for a passage between two pivotally connected vehicles or an aircraft passenger bridge or stairway is manufactured.

2. A method in accordance with claim 1, wherein the printing step comprises digitally printing the coating onto the bellow material.

3. A method in accordance with claim 2, wherein the digital printing step comprises inkjet printing.

4. A method in accordance with claim 1, further comprising:
   providing a plurality of bellows frames;
   arranged the bellows frames behind one another, with folds or corrugations of the bellows material being clampingly gripped by each bellows frame.

5. A method in accordance with claim 1, wherein the at least one reinforcement material is a fabric.

6. A method in accordance with claim 1, wherein the printing step comprises printing the flexible coating on only an outer surface of the bellows material.

7. A method in accordance with claim 1, wherein the printing step comprises printing a material having a polymer base.

8. A method in accordance with claim 7, wherein the material having a polymer base further has nanoparticles admixed therein to configure the surface as impervious and dirt-repellent.

9. A method in accordance with claim 1, wherein the printing step comprises printing a dye layer having a surface structured so as to provide a lotus effect.

10. A method of manufacturing a bellows for a passage between two pivotally connected vehicles or an aircraft passenger bridge or stairway, the method comprising:
    providing a flexible bellows material comprising at least one reinforcement material having an outer surface with at least one elastomer coating covering the outer surface; and
    printing a flexible coating onto all of at least one surface of the at least one elastomer coating of the bellows material so as to form a protective layer, the protective layer remaining flexible after printing;
    whereby a bellows for a passage between two pivotally connected vehicles or an aircraft passenger bridge or stairway is manufactured.

11. A method in accordance with claim 10, wherein the printing step produces a surface structured so as to provide a lotus effect to provide a dirt repellant surface.

* * * * *